(No Model.)

E. BUSS & A. SAURER.
EMBROIDERING MACHINE.

Patented Dec. 30, 1890.

Witnesses
Geo. W. Brown
Wm. H. Bates

Inventors:
Edward Buss & Adolph Saurer
by Marcellus Bailey
their attorney

THE NORRIS PETERS CO., PHOTO-LITHO., WASHINGTON, D. C.

Fig. 9.

(No Model.)  E. BUSS & A. SAURER.  13 Sheets—Sheet 5.
EMBROIDERING MACHINE.

No. 443,820.  Patented Dec. 30, 1890.

(No Model.) 13 Sheets—Sheet 6.

E. BUSS & A. SAURER.
EMBROIDERING MACHINE.

No. 443,820. Patented Dec. 30, 1890.

Witnesses
Geo. W. Brown
Wm. A. Bates

Edward Buss & Adolph Saurer
Inventors:
by Marcellus Bailey
their attorney

(No Model.)  13 Sheets—Sheet 8.

E. BUSS & A. SAURER.
EMBROIDERING MACHINE.

No. 443,820.  Patented Dec. 30, 1890.

Fig. 22.

(No Model.)  E. BUSS & A. SAURER.  13 Sheets—Sheet 11.
EMBROIDERING MACHINE.
No. 443,820.  Patented Dec. 30, 1890.

Fig. 23.

Witnesses
Geo. W. Brown
Wm H Bates

Inventors:
Edward Buss & Adolph Saurer
by Marcellus Bailey
their attorney (No Model.) 13 Sheets—Sheet 12.
E. BUSS & A. SAURER.
EMBROIDERING MACHINE.

No. 443,820. Patented Dec. 30, 1890.

(No Model.)

E. BUSS & A. SAURER.
EMBROIDERING MACHINE.

No. 443,820.

Patented Dec. 30, 1890.

Fig. 28.

UNITED STATES PATENT OFFICE.

EDWARD BUSS, OF ST. GALL, AND ADOLPH SAURER, OF ARBON, SWITZERLAND.

EMBROIDERING-MACHINE.

SPECIFICATION forming part of Letters Patent No. 443,820, dated December 30, 1890.

Application filed August 13, 1889. Serial No. 320,577. (No model.) Patented in Switzerland November 15, 1888, No. 2, and in France April 25, 1889, No. 197,732.

*To all whom it may concern:*

Be it known that we, EDWARD BUSS and ADOLPH SAURER, both citizens of Switzerland, residing, respectively, at St. Gall and at Arbon, Switzerland, have invented new and useful Improvements in Embroidering-Machines, (for which we have obtained Swiss Letters Patent No. 2, dated November 15, 1888, and French Letters Patent No. 197,732, of April 25, 1889,) whereof the following is a specification.

Our invention relates to embroidering-machines that work with a plurality of needles having a point at each end and an eye in the middle, and with threads of definite length fastened at one end in the eyes of the needles, the said needles being operated by means of reciprocating grippers or tongs to pass to and fro through the cloth in which the embroidery is to be made, and the cloth being moved previous to every stitch in the direction and by the distance required for the formation of the same. Moreover, the machines to which our invention is applied are such as have grippers mounted on slides whose stroke is considerably shorter than the threads.

The object of the improvements is to render the machine as far as possible automatic in its operation; to allow long threads to be used with a short stroke of the grippers, and thereby to reduce the pauses for supplying the machine with newly-threaded needles; to increase the performance of the machine, and to make the same more compact. For this purpose we combine with each co-operating pair of the said grippers two pairs of instruments, consisting in take-up hooks and in thread-stretchers. The said hooks have the function to alternately take up and pay out the threads, to draw them through the cloth, and to keep them extended, while the thread-stretchers mainly serve to draw each stitch tight, and by doing so to control mechanism combined with the take-up hooks, whereby the stroke of the said hooks is reduced after every stitch in proportion to the amount of thread used up in making the same.

In the annexed drawings, Figure 1 is a sectional side elevation of two grippers $a'$ $a^2$ in their position close to the cloth, and of the take-up hooks $b'$ $b^2$ and thread-stretchers $d'$ $d^2$ in corresponding positions. Fig. 2 is a front view of a gripper; Fig. 3, an elevation of a take-up hook; and Fig. 4, a top view thereof, together with a portion of a thread. Figs. 5 to 8 are views of the grippers, the take-up hooks and the thread-stretchers in different positions, showing their operation on the thread, the latter being represented exaggerated in thickness in order to render it more distinct; Fig. 14 is a front view of other parts comprised in Fig. 10, also drawn to a larger scale, the guiding-arm $l^4$ being shown in inclined position. Fig. 14$^a$ is a horizontal section on line $z\ z$, Fig. 15, with the arm $l^4$ in vertical position. Fig. 16 is a larger front view of the mechanism, shown in outlines at the top of Fig. 14 and serving to gradually reduce the length of stroke of the take-up hooks. Fig. 17 is a sectional plan, and Fig. 18 a side view, of the said mechanism. Fig. 19 shows some parts thereof in different position. Fig. 24 is a sectional elevation, taken from the right-hand side of Fig. 25, of the mechanism which operates the thread-stretchers. Fig. 27 is an enlarged perspective view of certain parts serving to control the reduction in length of stroke of the take-up hooks.

Figure 10:
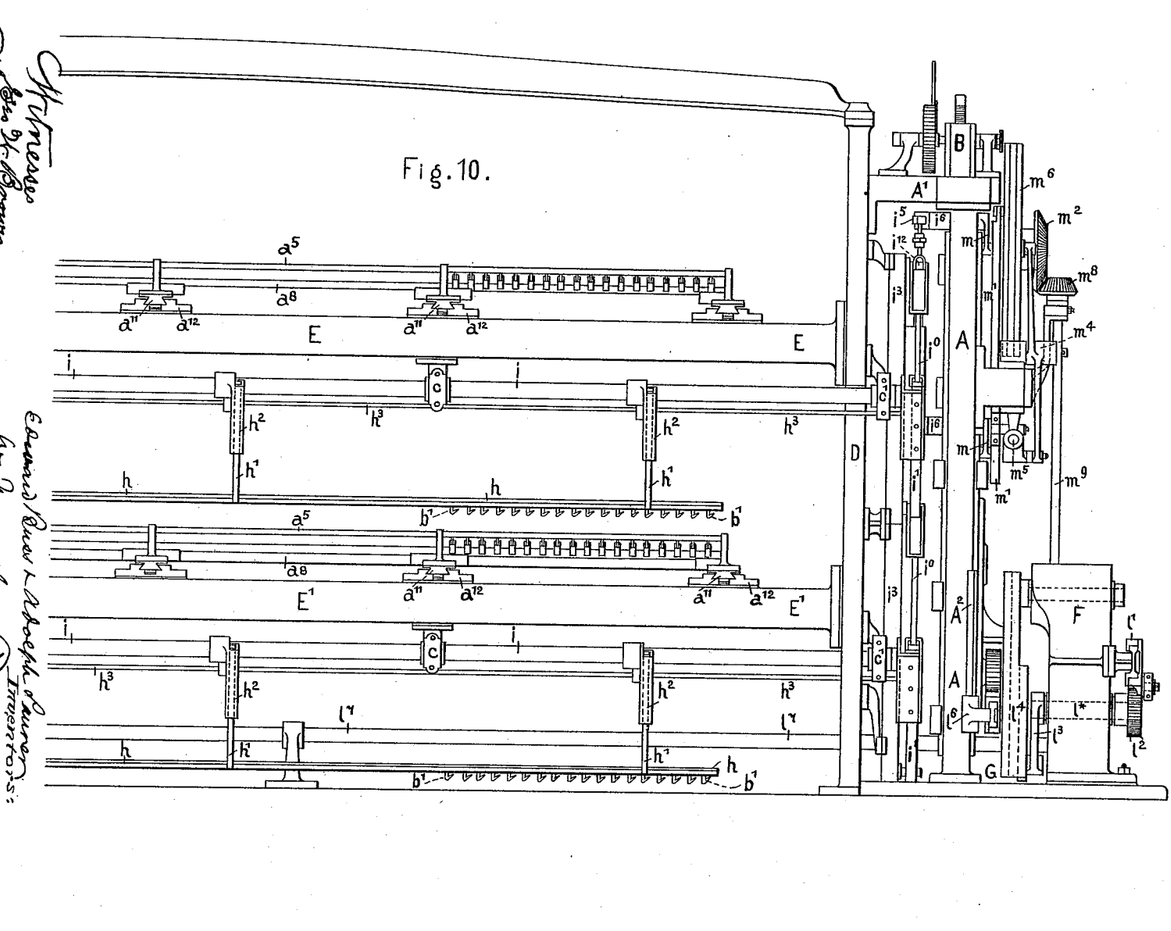
Fig. 10 is a side view of about one half of a two-story machine comprising the aforesaid mechanism, the other half, which contains the gripper-actuating mechanism, being omitted because the latter does not form any part of the invention claimed. For the same reason the cloth-frame and the means for operating it are not shown in the drawings.

*Instrumentalities and their mode of operation.*—The grippers (see Figs. 1 and 2) consist of the lower jaw $a^4$, the upper jaw $a^3$, pivoted thereto, and a spring $a^7$, arranged to press the fore end of the jaw $a^3$ down, so as to cause it to clamp the needle $g$, introduced between the jaws. The jaw $a^4$ projects over the jaw $a^3$, and is provided with a lip $a^9$, having a notch $a^{10}$, which serves to keep the needle in the proper line. The grippers belonging to the same series are fixed by means of their jaws $a^4$ to a common bar $a^8$, (see also Fig. 10,) and this bar is secured to a number of slides $a^{11}$, moving in guides $a^{12}$, that are mounted on the longitudinal beams E and E'.

$a^5$ and $a^6$ are eccentric-shafts, by means whereof the tail ends of the upper jaws $a^3$ are depressed and allowed to rise at the required moments. The means for imparting motion to the slides $a^{11}$ and to the eccentric-shafts $a^5$ and $a^6$ will not be described for the reason already stated that they are not comprised in this invention.

Figures 1, 2, 3, 4, 5, 6:
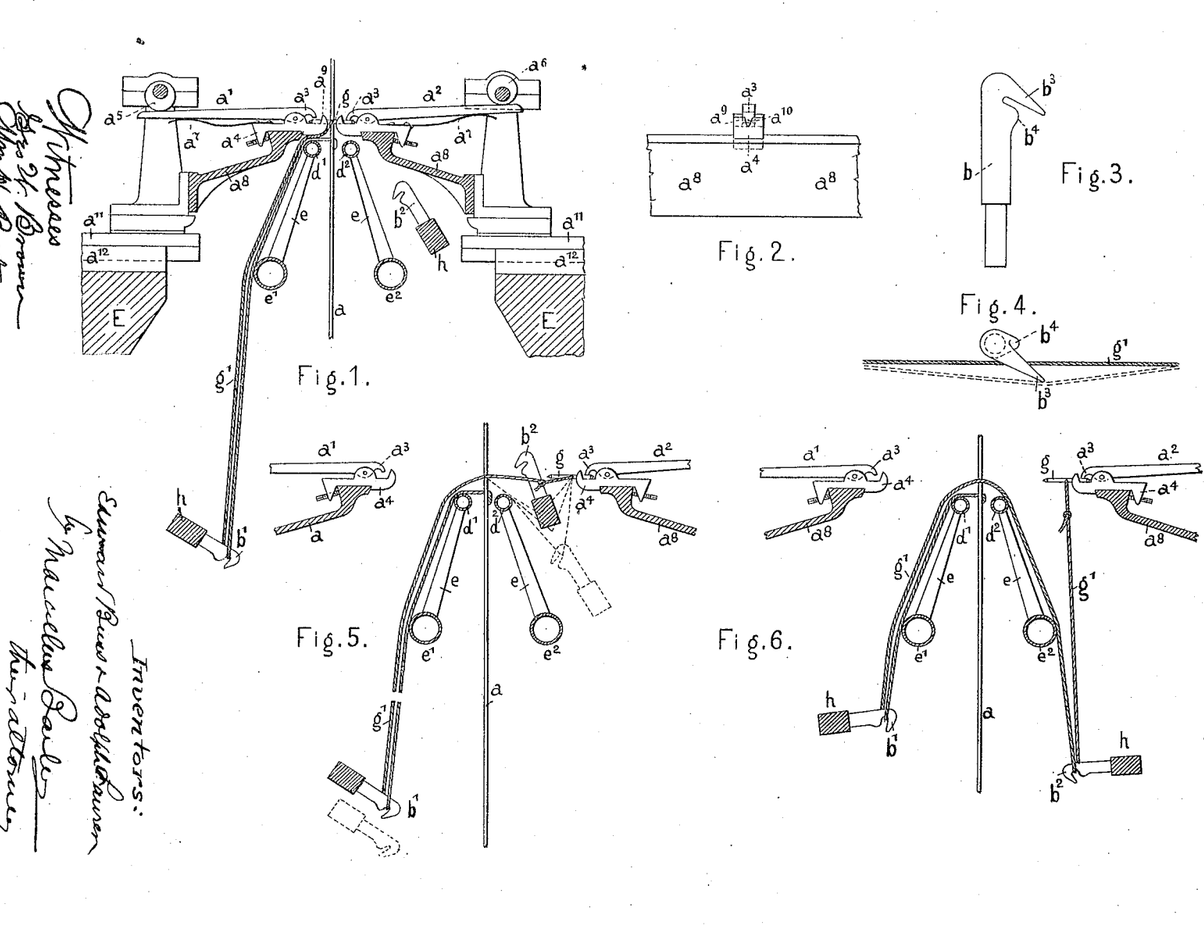

Figs. 3 and 4 show one of the take-up hooks. These hooks have a beak $b^3$ inclined to their plane of motion, which is parallel to the thread $g'$, Fig. 4, and besides they are provided with a rounded projection $b^4$, located sideward of the central plane of the shank and the beak, and which prevents the thread from slipping onto the shank of the hook when the latter is inclined downward, as is the case with the hook $b'$ in Fig. 1. The said hooks are fixed to bars $h$ (see also Fig. 10) in such position as to adapt their beaks to catch the threads on which they have to operate.

Figures 24, 26, 27:
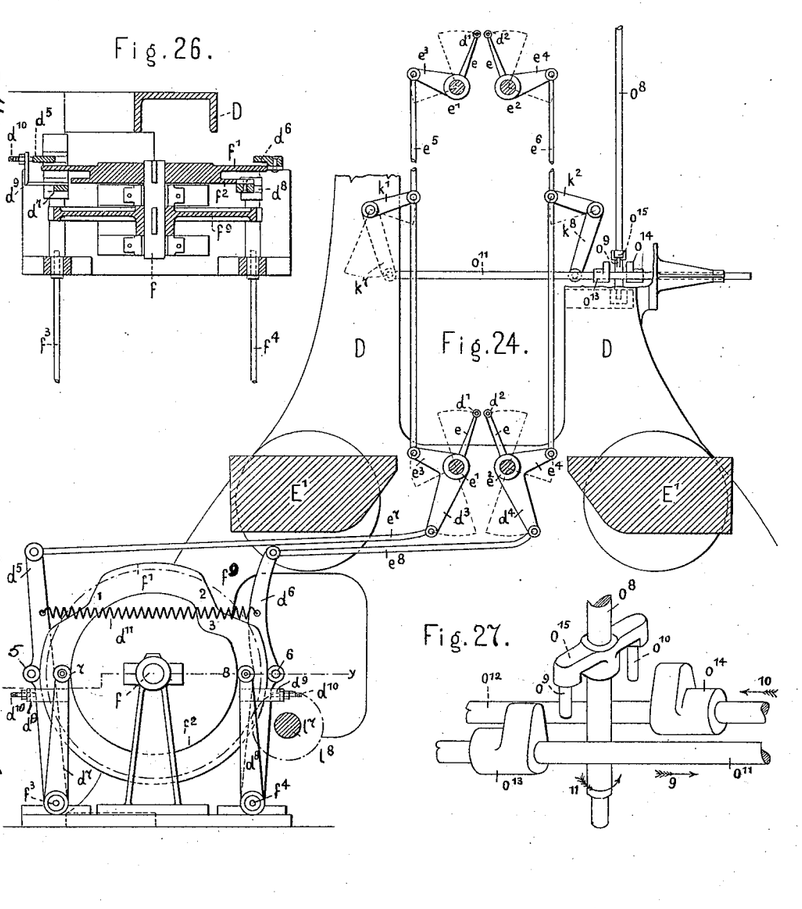
Figure 25:
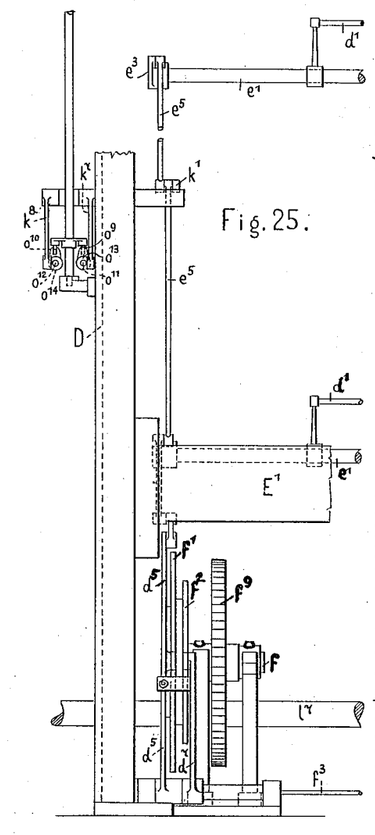
Fig. 25 is a side elevation thereof, and Fig. 26 a sectional plan on line $y\ y$, Fig. 24.

The thread-stretchers consist in bars $d'\ d^2$, Figs. 1, 24, and 25, secured to the ends of arms $e$, which are fixed to the oscillating shafts $e'$ $e^2$. For sake of lightness the said bars and shafts are preferably made tubular.

When the described parts have the position represented by Fig. 1, the grippers $a'$ and $a^2$ are at the inward end of their stroke, the needle $g$ has passed by one-half through the cloth $a$, the gripper $a'$, opened by the eccentric-shaft $a^5$, has released the needle, while the gripper $a^2$, closed by the spring $a^7$, has seized the same, the hook $b'$ is at the bottom end of its course, the hook $b^2$ is at rest below the gripper $a^2$, the thread-stretchers $d'\ d^2$ are close to the cloth, and the thread $g'$ passes from the cloth over the stretcher $d'$, around the hook $b'$, and back over the stretcher $d'$ to the needle.

First operation. Both grippers recede from the cloth, (see Fig. 5,) the needle held by the gripper $a^2$ draws a portion of the thread along with it through the cloth, and the hook $b'$ rises from its lowest position (indicated by dotted lines) by as much as is required to pay out an equivalent portion of thread; then the hook $b^2$ rises until its beak is above the thread extending from the needle to the cloth, the said beak during this motion pushing the thread sideward, as shown by dotted lines in Fig. 4, and slipping over the same. Finally, the thread-stretcher $d'$ swings outward a little, so as to moderately stretch the thread in order that the hook $b^2$, on descending again, may with certainty catch it.

Figure 7:
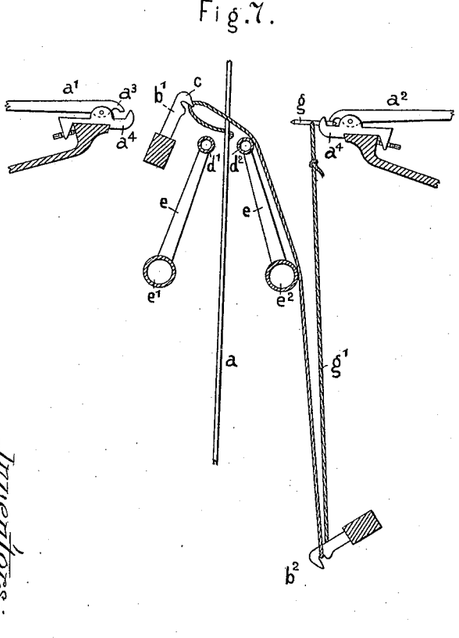

Second operation. The hook $b^2$ descends and engages with the thread which is below it and the stretcher $d'$ returns to its normal position. Thereupon the hook $b'$ rises farther, while the hook $b^2$ continues to descend; but as the thread acted upon by the former is at first extended in a straight line and then bends to form an angle gradually decreasing in size, as shown by dotted lines in Fig. 5, whereas the parts of thread guided by the hook $b'$ are parallel, the amount of thread taken up by the hook $b^2$ is for any fraction of this portion of its course less than the amount paid out by the hook $b'$ for a like fraction of its course. The speed of motion of the hook $b^2$ must, therefore, at this period be greater than that of the hook $b'$, and the difference of the two speeds must gradually diminish until the thread parts passing over the hook $b^2$ have become parallel, or nearly so. From that time the two speeds have to be equal. Fig. 6 shows the two hooks about in the middle of their course. Finally, the hook $b'$, arriving at the top end of its course and coming into the position shown by Fig. 7, in which it is above the path of the needle, releases the thread, while the hook $b^2$, on approaching the bottom end of its course, takes up the slack produced by the said release and nearly draws tight the stitch-forming portion thereof.

Figure 8:
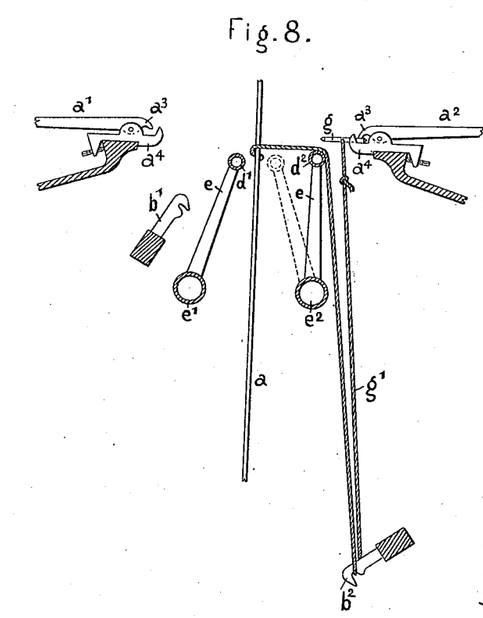
Figure 9:
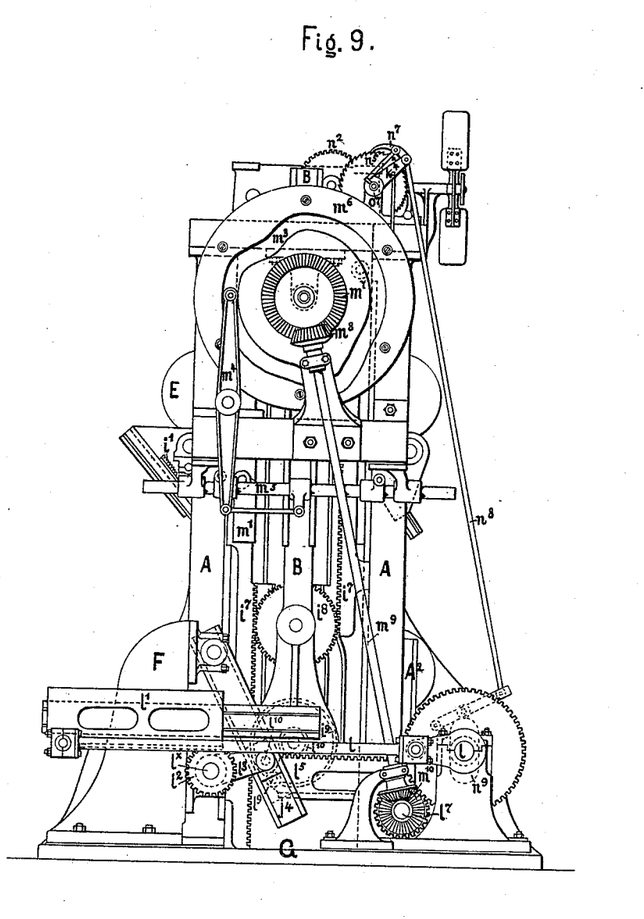
Fig. 9, a view from the right-hand end of the machine represented by Fig. 10, is a front view of the mechanism for operating the take-up hooks and the thread-stretchers.

Third operation. The thread-stretcher $d^2$ swings outward into the position shown by full lines in Fig. 8 and finishes the stitch by drawing the thread tight completely, the hook $b'$ redescends below the path of the gripper $a'$, the thread-stretcher $d^2$ returns to its normal position, and the hook $b^2$ finally takes up the slack which is thereby left in the thread. At this operation the thread-stretcher also serves as the medium for determining the length of thread used up in making any stitch, the length of the next stroke of the hook $a$ having to be regulated in accordance with the consumption of thread.

Fourth operation. The cloth is moved by known means in the direction and by the distance required for a new stitch, the grippers move toward each other, the needle passes by half its length through the cloth, the gripper $a'$ closes to seize the same, and the gripper $a^2$ opens to release it. The parts are then in a position which is the inverse of that shown by Fig. 1. These operations are thereupon repeated, only that what has been stated with respect to the different parts now takes place with their counterparts.

Figure 12:
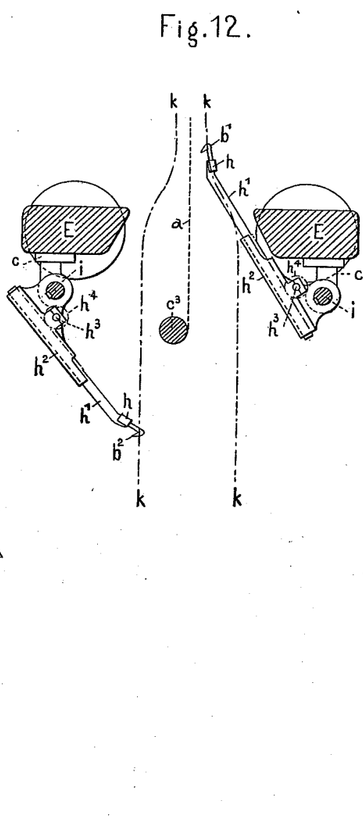
Fig. 12 is a sectional elevation on line $x\ x$, Fig. 11, and Fig. 13 a front view corresponding to Fig. 11.

In order to perform the said operations, the described parts or instrumentalities have to be actuated as follows:

a. The take-up hooks $b'$ $b^2$ must be moved in opposite directions from one end of their course to the other. This motion we shall call the "main motion." Besides, they have to be so guided that when being at the top of their course they will come close to the cloth $a$, and that during another part of their course the hooks on one side of the machine will pass by the side of the roller to which the lower edge of the cloth $a$ is attached. In Fig. 12 this roller is shown in section and marked by letter $c^3$, while the lines $k$ $k$ indicate the paths in which the hooks are preferably caused to move.

b. When the take-up hooks are at the ends of their course, they require to have the described particular motions, which we shall term "supplementary motions."

c. The thread-stretchers must be moved outward twice for each stitch with different force.

d. The length of stroke (main motion) of the hooks has to be reduced after every stitch in proportion to the length of thread used up in making the same.

Figure 11:
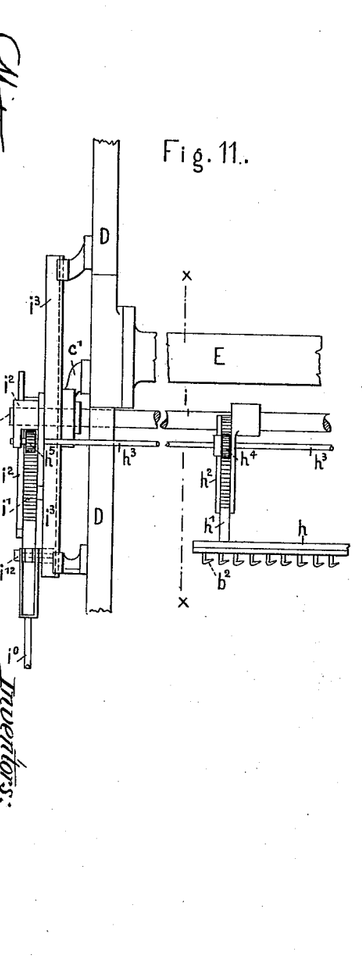
Fig. 11 is a rear side view of a portion of the mechanism from the upper story of the two-story machine, the said view being drawn to a larger scale.

*Mechanism for producing the main motion of the take-up hooks.* (See Figs. 10 to 13.)— The hooks belonging to the same line or series are fixed to a bar $h$, preferably of wood, which in turn is fixed to a number of transverse bars, so as to constitute therewith a kind of frame, the said transverse bars being provided with teeth to form the racks $h'$ and arranged to slide in guides $h^2$. These guides are keyed on a shaft $i$, parallel to the bar $h$, and mounted in bearings $c$, that are fixed to a beam E, connecting the two standards D of the machine. (In the drawings only one of these standards appear.) On the end of the shaft $i$, being outside of the standard D, Fig. 11, and carried by bearing $c'$, a guiding-piece $i^2$ is secured, in which slides a rack $i'$, parallel to the racks $h'$. Moreover, a shaft $h^3$ is mounted in the guides $h^2$ and $i^2$, the said shaft being parallel to the shaft $i$ and carrying as many pinions $h^4$ as there are racks $h'$ and one pinion $h^5$, all of the same diameter, which gear respectively with the racks $h'$ and the rack $i'$. Now, if under these conditions the inner end of the rack $i'$ is moved up or down, the rack will slide within the guide $i^2$ and rotate the pinion $h^5$, together with the shafts $h^3$, thus causing the pinions $h^4$ to move all the racks $h'$ in their guides in uniformity with the sliding motion of the rack $i'$, while at the same time the said rack $i'$, acting through the guide $i^2$ on the shaft $i$, brings about a rotation of the latter, which is transmitted by the same to the guides $h^2$. Consequently if a point of the rack $i'$, being in a line with the corresponding take-up hooks, be guided in a certain path all the said hooks will follow like paths. According to Figs. 11 and 13 the means for thus guiding the racks $i'$ consist in a grooved cam-guide $i^3$ and a pivot $i^{12}$ on the rack $i'$, the said pivot (preferably provided with a roller) engaging in the groove of the guide $i^3$. The hooks $b'$ $b^2$ are thereby conducted in the lines $k$ $k$, Fig. 12. In a two-story machine, such as the one shown by Fig. 10, the motion of the upper pivot $i^{12}$ is transmitted to the corresponding lower pivot $i^{12}$ by rods $i^0$, Figs. 11 and 13. The upper pivot of each of the described mechanisms is connected by a link $i^4$ to a horizontal arm $i^5$, Figs. 13 and 14, of an axle $i^6$, mounted in a sleeve $c^4$ at the top of a sliding bar $i^7$, guided by ways on the corresponding frame-post A, and having rack-teeth that gear with the spur-wheels $i^8$ $i^9$. Supposing, for the present, the axle $i^6$ to be fixed in the sleeve $c^4$, an alternating rotation of the wheel $i^9$ will produce a reciprocating motion of the two bars $i^7$ in opposite directions, and consequently a like motion of the aforesaid pivots $i^{12}$. The wheel $i^9$ is keyed on an axle $i^{11}$, Fig. 15, together with a pinion $i^{10}$, gearing with teeth on a slide $l^5$, which moves on a guide $l^6$. The slide $l^5$ has a pin $l^9$, that engages by means of a slide-block in a groove $j^3$ on the rear face of a lever-arm $l^4$, (see also Fig. 14$^a$,) the said arm being caused to oscillate by means of a crank $l^3$, engaging by its pin $l^{10}$ and a slide-block in a groove $j^4$ on the front face of the same. The crank $l^3$ is connected by its axle $l^*$ to a pinion $l^2$, paired with rack-teeth formed on a slide $l'$, which is carried by a stationary guide $j^2$, and is moved to and fro by a driving-shaft $l$ through the medium of a crank $b^6$, keyed thereon, and the connecting-rod $l^0$. If under these conditions the shaft $l$ is rotated, the crank $l^3$ will be oscillated, and in turn it will impart oscillating motion to the lever-arm $l^4$, which thereupon acts through the pin $l^9$ on the slide $l^5$ so as to move the same to and fro, and the latter produces alternating rotative motion of the pinion $i^{10}$, and consequently of the wheel $i^9$. The proportions of the parts are such that the crank $l^3$ will swing out far enough to either side to pass somewhat beyond its rectangular positions in respect to the lever-arm $l^4$, or beyond its dead-centers relatively to the arm, in order that a prolonged stoppage (or more precisely a slight retrograde motion) of the latter, and consequently an interruption of the main motion of the take-up hooks, be produced when these are at the ends of their course, the time which the said interruption lasts being the main part of the period in which the hooks perform the supplementary motions. The aforesaid axle $i^{11}$ of the wheel $i^9$ and pinion $i^{10}$ is mounted in and the horizontal guide-bar $l^6$ is fixed to a piece B, extending in form of a bar to the top of the machine, and arranged to be shifted in vertical direction, the combined piece B $l^6$ being guided at the bottom by the ways $A^2$, Figs. 14 and 14$^a$, on the posts A and at the top by the pieces $c^5$, Fig. 17, fixed to the frame part A′. The purpose of this disposition is to afford means for gradually reducing the length of stroke of the take-up hooks, as will be fully described hereinafter.

In order that the bars $i^7$ may be made short enough as not to pass with their lower ends below the base-plate of the machine when the piece B $l^6$ is in its lowest position and the stroke of the bars $i^7$ is greatest, the aforesaid auxiliary spur-wheel $i^8$, gearing with the teeth on the said bars, is mounted in the bar B above the wheel $i^9$. This auxiliary wheel transmits motion from one bar $i^7$ to the other whenever one of them is raised so far that it comes out of engagement with the wheel $i^9$.

Figure 23:
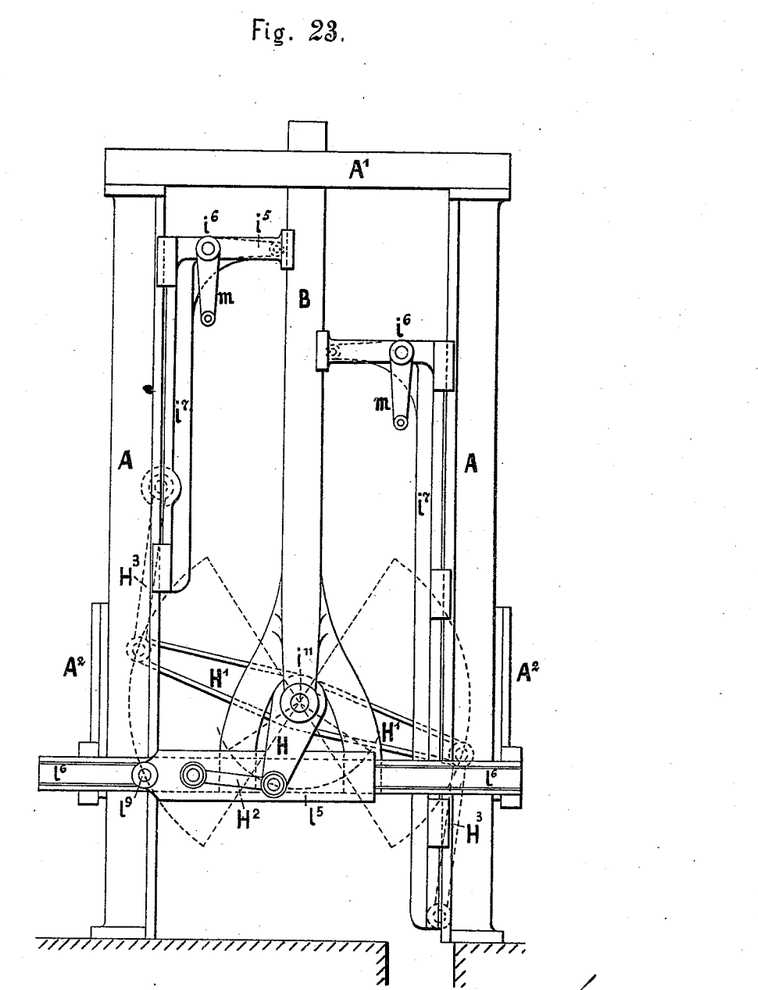
Fig. 23 represents a modification of the mechanism shown by Fig. 14.

Fig. 23 shows a modification of the mechanism serving to convert the horizontal reciprocating motion of the slide $l^5$ into vertical reciprocating motion of the bars $i^7$, the modified mechanism consisting in the arm H and the lever H′, keyed on the axle $i^{11}$, the link H$^2$ connecting the slide $l^5$ with the arm H and the links H$^3$ connecting the lever H′ with the bars $i^7$.

*Mechanism for producing the supplementary motions of the take-up hooks.*—These motions are the following:

*a.* After the hook, which is at the top of its course, has released the stitch-forming loop it moves downward sufficiently to be out of the way of the corresponding gripper when the same moves forward. (See Figs. 7 and 8, hook $b'$.)

*b.* Immediately after the gripper has receded the hook rises again to catch the thread. (See Fig. 5, hook $b^2$.)

*c.* When the needle, after having passed the cloth, draws a certain length of thread along with it, the hook, being at the bottom, must rise quickly by about half the said length, in order to pay out an equal amount of thread. (See Fig. 5, hook $b'$.)

*d.* At the beginning of the main motion of both hooks the upper hook must descend with a speed which is greater than that with which the lower hook ascends for the reasons hereinbefore set forth.

Figure 13:
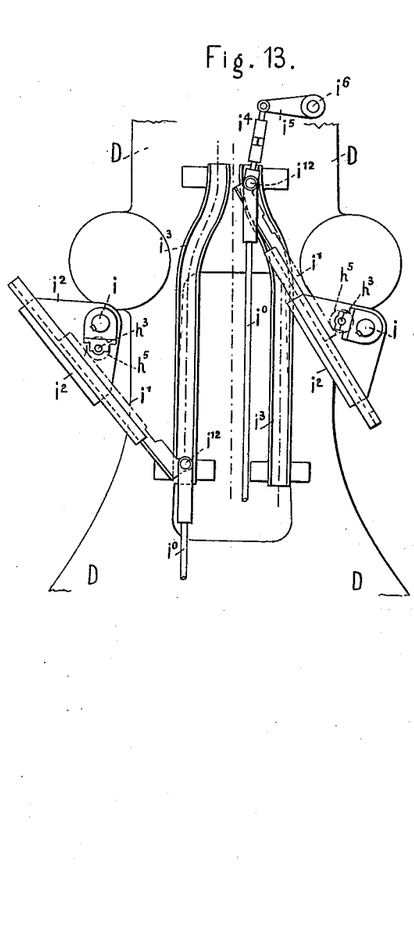
Figures 14, 14A:
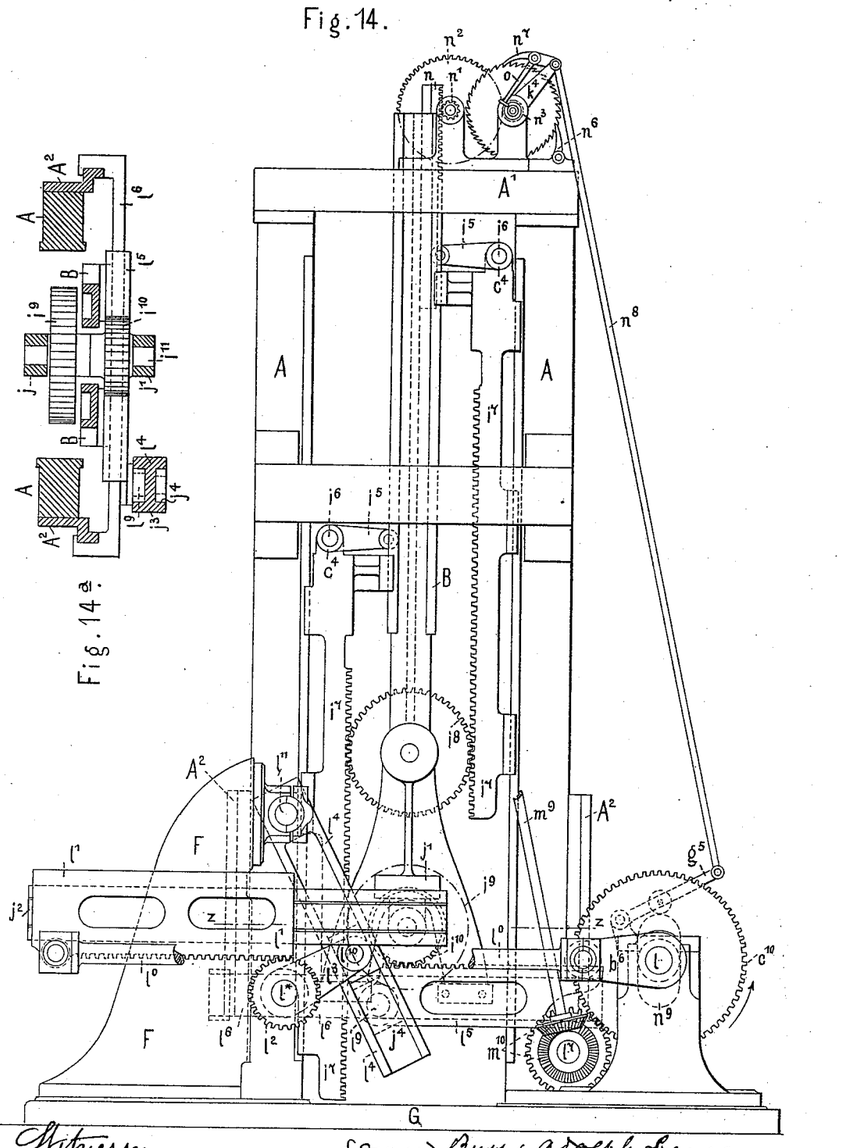
Figure 15:
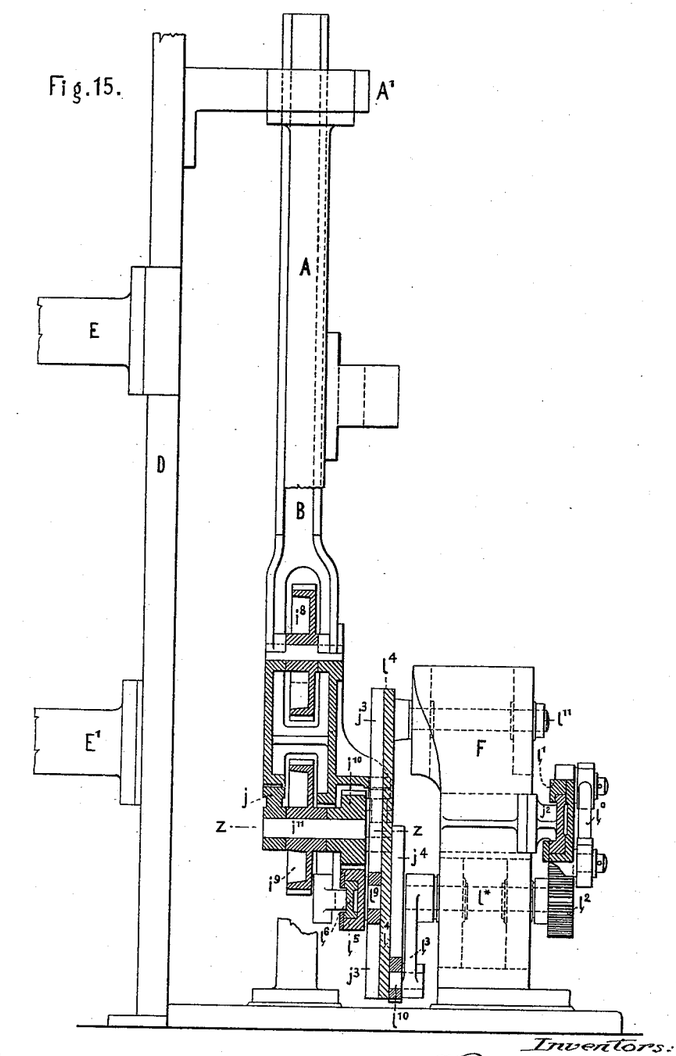
Fig. 15 is a sectional side view corresponding to Fig. 14, except that in this figure the arm $l^4$ is also in vertical position and that some parts are omitted.
Figure 20:
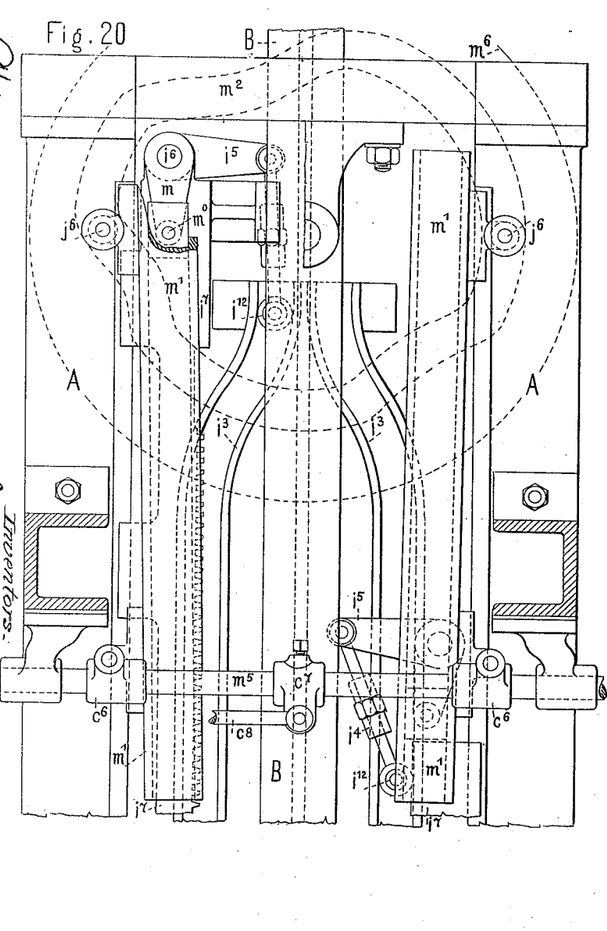
Fig. 20 is a sectional elevation, Fig. 20$^a$ a section along the center line of pin $m^0$, Fig. 21 a sectional side view, and Fig. 22 a front view, (with a portion in section,) illustrating the parts that serve to control the motion of the take-up hooks at the ends of their stroke.
Figures 20A, 21:
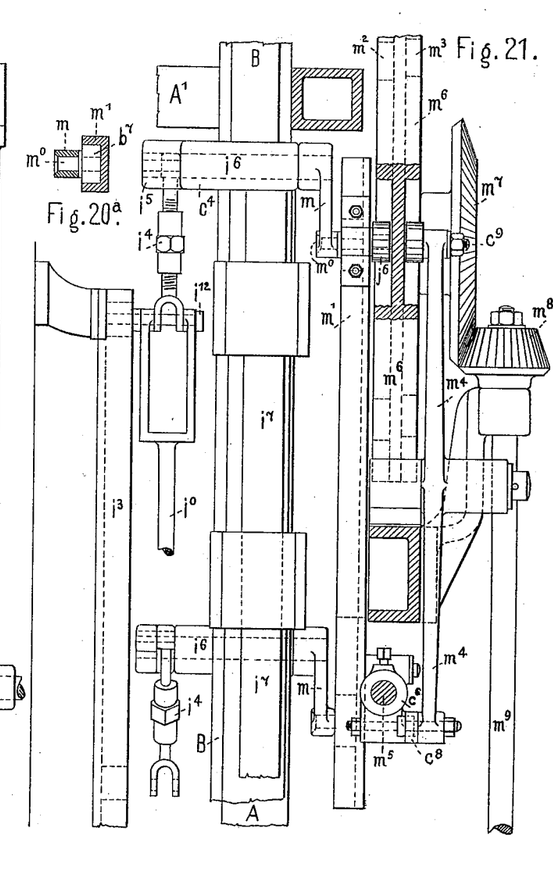

For producing these motions each of the aforesaid axles $i^6$, Figs. 13 and 14, carrying a horizontal arm $i^5$ and mounted in a sleeve $c^4$ at the top of either bar $i^7$, is provided with a vertical arm $m$, Figs. 20 and 21, having a pin $m^0$, which engages by means of a slide-block in a groove $b^7$, Fig. 20$^a$, formed in a vertical bar $m'$, so that when the corresponding bar $i^7$ moves up and down the pin $m^0$ slides with its block in the groove $b^7$. The bar $m'$ is arranged to be movable laterally, and it is so operated by cam-motion that it will impart to the pin $m^0$, and consequently to the take-up hooks, the required auxiliary motion independently of the vertical motion of the pin $m^0$ relatively to the bar $m'$.

Figure 22:
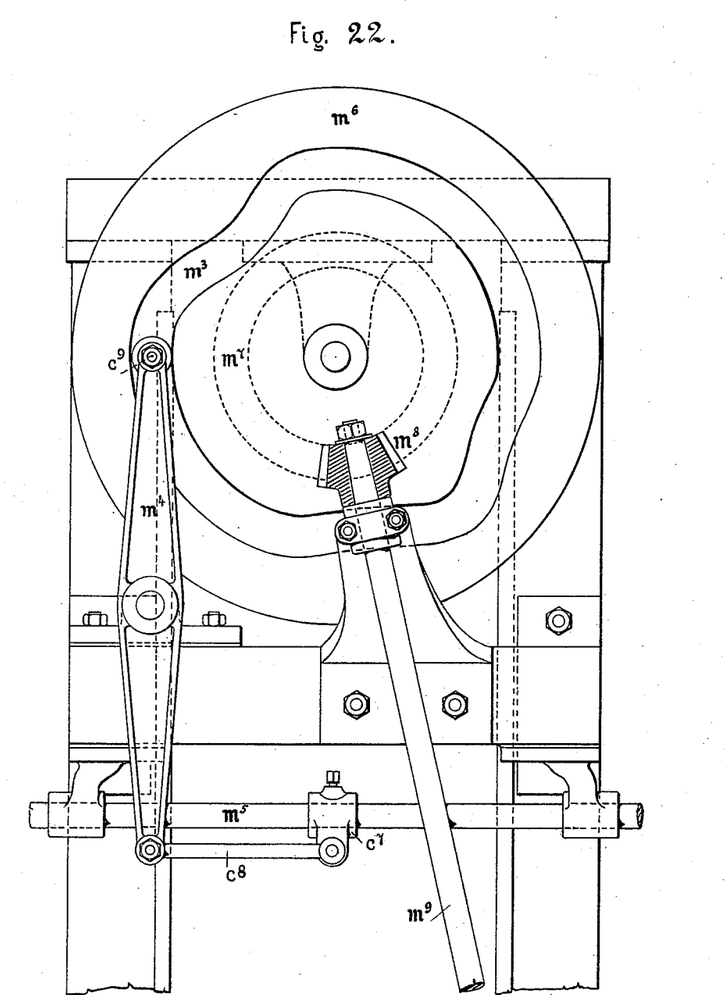

As shown by Figs. 20 and 21, each bar $m'$ is pivoted to a sleeve $c^6$, secured to a sliding rod $m^5$, and this rod is connected by means of another sleeve $c^7$, fixed thereto, and a link $c^8$, to one arm of a lever $m^4$, Figs. 21 and 22, the other arm whereof engages, through the medium of a pin $c^9$, provided with a roller, in the front cam-groove $m^3$ of the disk $m^6$, so that when the disk is rotated the surfaces of said cam-groove will impart lateral motion to the lower end of the bar $m'$. For producing such motion of the upper end of the bar this end is provided with a pin $j^6$, engaging by means of a roller with another cam-groove $m^2$ on the back of the disk $m^6$. The form of these grooves is determined by placing the two series of hooks $b'$ $b^2$ in a number of successive positions, as required, marking on the disk $m^6$ the corresponding positions of the pins $j^6$ and $c^9$, and cutting the grooves in accordance therewith. The rotation of the disk $m^6$ is obtained by means of a bevel-wheel $m^7$, keyed on the axle of the disk, bevel-pinion $m^8$, shaft $m^9$, the pair of bevel-wheels $m^{10}$, and driving-shaft $l^7$, Fig. 14.

*Mechanism for operating the thread-stretchers.*—The shafts $e'$ $e^2$ (see Figs. 24 and 25) of the thread-stretchers $d'$ $d^2$ are provided with the respective arms $e^3$ $e^4$, and in the two-story machine the upper arms $e^3$ $e^4$ are connected to the lower corresponding arms by the rods $e^5$ $e^6$. The lower shaft $e'$ has, moreover, the arm $d^3$, which is connected by a rod $e^7$ to a lever $d^5$, while the shaft $e^2$ has an arm $d^4$, connected by the rod $e^8$ to the lever $d^6$. The said levers are operated by a cam-disk $f'$, having the recesses 1 and 2, and by a spring $d^{11}$, connecting the levers together and drawing them against the disk $f'$. Moreover, there are two levers $d^7$ $d^8$ co-operating with a cam-disk $f^2$, having a single recess 3, the said disk being fixed, together with the disk $f'$, on the same axle $f$, which is driven by the wheels $f^9$ and $l^8$ from the main shaft $l^7$. The levers $d^7$ and $d^8$ have each an arm $d^9$ (see also Fig. 26) with screw $d^{10}$, by means whereof they act from the back on the respective levers $d^5$ $d^6$, and to their axles are attached thin elastic rods $f^3$ and $f^4$, constituting torsional springs, which press the levers against the disk $f^2$. The said parts are so arranged relatively to the other operating parts of the machine that the recess 1 of the disk $f'$ will be opposite to the roller 5 on lever $d^5$ when the thread-stretchers $d'$ are to be swung outward with but slight force, as described with reference to Fig. 5, the force with which they are actually operated being under these conditions dependent upon the tension of the spring $d^{11}$ alone, which is regulated accordingly. In like manner the recess 1 causes a like operation of the stretchers $d^2$ through the medium of the lever $d^6$ with roller 6. When the thread-stretchers are to be swung outward with greater force, as set forth with reference to Fig. 8, the levers $d^7$ and $d^8$ come into operation. Thus when such action of the stretchers $d'$ is to take place the recess 2 of disk $f'$ has to come opposite to the roller 5 of lever $d^5$ and the recess 3 of disk $f^2$ opposite to roller 7 of lever $d^7$. The lever $d^5$ will then be caused to act by means of the spring $d^{11}$ as in the first case; but in addition thereto it will be impelled in the same direction through the medium of the torsional spring $f^3$, lever $d^7$, arm $d^9$, fixed thereto, (see also Fig. 26,) and screw $d^{10}$ pressing against the lever $d^5$. In similar manner the co-operation of the recesses 2 and 3, the levers $d^8$ $d^6$, and parts appertaining thereto, causes the stretchers $d^2$ to swing outward with greater force.

Figure 28:
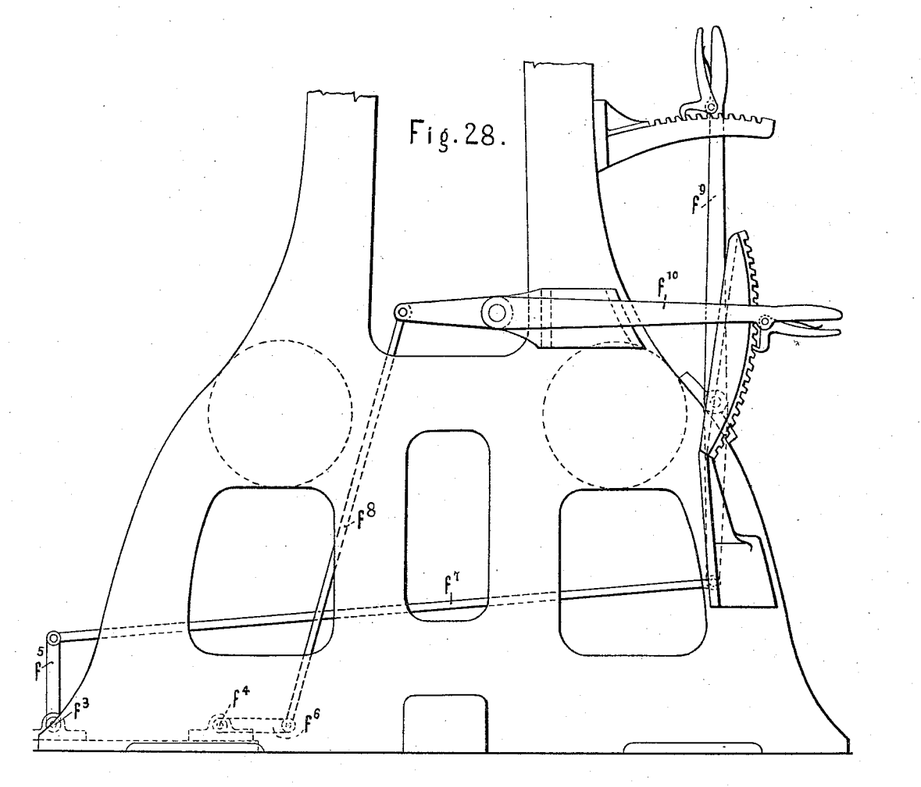
Fig. 28 shows the means for regulating the force with which the thread-stretchers act on the threads.

For the purpose of allowing the tension of the springs $f^3$ and $f^4$ to be regulated according to the force with which it is desired to stretch the threads, the spring $f^3$ is provided at its outer end with a lever $f^5$, Fig. 28, connected by a rod $f^7$ to a hand-lever $f^9$, and the spring $f^4$ with a lever $f^6$, connected by a rod $f^8$ to a hand-lever $f^{10}$, both hand-levers having means for locking them in the required position.

Figures 16, 17, 18, 19:
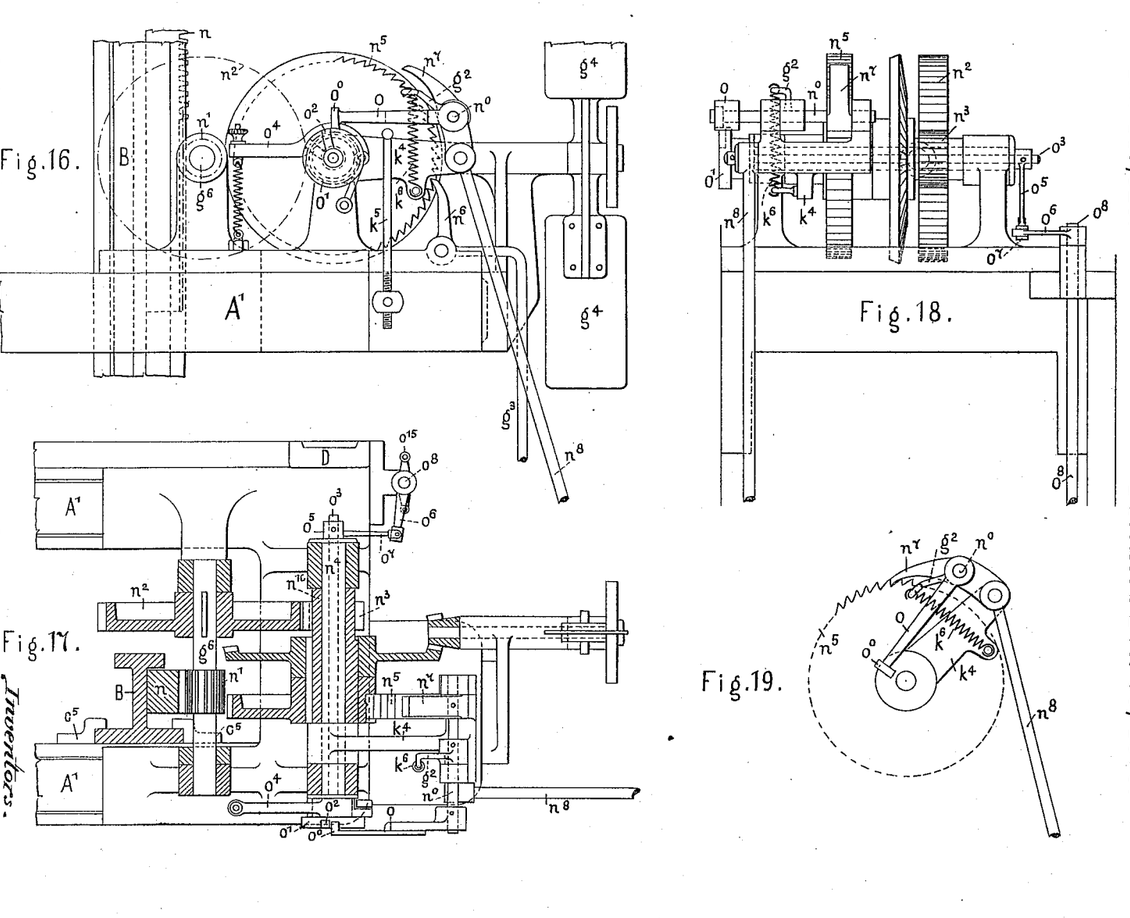

*Mechanism for reducing the length of stroke of the take-up hooks after every stitch.*—The combined piece B $l^6$, hereinbefore described, is connected to the shaft $l$, Fig. 14, by a mechanism comprising the tappets $n^9$, secured to the said shaft, lever $g^5$, operated by the tappets $n^9$, rod $n^8$, connecting the said lever to an arm $k^4$, Figs. 9, 14, 16, 17, and 18, turning loosely on an axle $n^4$, Fig. 17, ratchet-wheel $n^5$, keyed on a sleeve $n^{10}$, also loose on the axle $n^4$, feed-pawl $n^7$, fixed to an axle $n^0$, which is mounted in eyes on the arm $k^4$, spring $k^6$, connecting the feed-pawl, through the medium of the axle $n^0$ and an arm $g^2$, to the arm $k^4$, so as to cause the pawl to be drawn toward the ratchet-wheel, pinion $n^3$, integral with the sleeve $n^{10}$, spur-wheel $n^2$, keyed on the axle $g^6$ and gearing with pinion $n^3$, and pinion $n'$, formed in one piece with the axle $g^6$ and gearing with the rack $n$, which is fixed to the bar B. $n^6$ is a retaining-pawl having the disengaging-rod $g^3$.

When the machine is in operation, the feed-pawl $n^7$, provided it be continuously in engagement with the teeth of the ratchet-wheel $n^5$, will be caused by the tappets $n^9$, Fig. 14, to rotate the said wheel, whereby the piece B $l^6$ is slowly raised. The consequence of this is that the slide $l^5$, paired with the lever-arm $l^4$, will be raised also and that the pin $l^9$, Figs. 14 and 15, will be brought closer to the axis of oscillation $l^{11}$ of the lever-arm $l^4$. The length of stroke imparted by the lever $l^4$ to the slide $l^5$ will therefore become smaller and the stroke of the take-up hooks will be reduced accordingly. Taking into account, however, that in the measure as the piece B $l^6$ rises the connection established between the said piece and the two bars $i^7$ by the wheels $i^8$ and $i^9$ causes both bars $i^7$ to rise by the same amount, it is evident that the ascending motion of the piece B $l^6$ will put the take-up hooks into a higher mean position independently of the reduction of their stroke. Now the parts having influence on these operations are so proportioned to each other that the stroke of the hooks is shortened at the lower end only, whereas their uppermost position always remains the same, as is required for their co-operation with the needles. If all the stitches to be made were of equal length, the described mechanism would be available for reducing the stroke of the hooks in accordance with the amount of thread used up for each stitch; but the stitches have different length, and therefore another mechanism is required that controls the amount by which the piece B $l^6$ is raised after every stitch.

*Controlling mechanism.*—Through the axle $n^4$, Fig. 17, which is hollow, is passed the shaft $o^3$, having at its forward end a disk $o'$ with groove $o^2$, Fig. 16, and at its rear end an arm $o^5$, Figs. 17 and 18. The said disk $o'$ co-operates with the controlling-arm $o$, fixed to the axle $n^0$ of the pawl $n^7$, and having a head $o^0$, adapted to engage with the said groove $o^2$. The arm $o^5$ of the shaft $o^3$ is connected by a link $o^7$ to the arm $o^6$ of a vertical shaft $o^8$, carrying near its lower end the two-armed lever $o^{15}$, Figs. 17, 24, 25, and 27, having the pins $o^9$ and $o^{10}$. Moreover, the rod $e^5$, Fig. 24, is connected by the two-armed lever $k'$ $k^7$ to a rod $o^{11}$, Figs. 24, 25, and 27, provided with the tappet $o^{13}$, while the rod $e^6$ is connected by the lever $k^2$ $k^3$ to the rod $o^{12}$, provided with the tappet $o^{14}$. (In Fig. 24 the rod $o^{12}$ is covered by the rod $o^{11}$, but in Fig. 27 both rods are clearly visible.) The rods $o^{11}$ $o^{12}$ and the tappets $o^{13}$ $o^{14}$ are so arranged relatively to the pins $o^9$ $o^{10}$ that when the rod $o^{11}$ is moved in the direction of the arrow 9, Fig. 27, it will strike against the pin $o^9$, and when the rod $o^{12}$ is moved in the direction of the arrow 10 it will act on the pin $o^{10}$, the shaft $o^8$ being in either case rotated in the direction of the arrow 11. This rotation is transmitted through the aforesaid connections $o^6$ $o^7$ $o^5$ $o^3$, Fig. 17, to the disk $o'$. Now supposing a short stitch—*i.e.*, a stitch in which but little thread is used up—to have been made, the thread-stretcher which has to draw the stitch tight—say the stretcher $d'$—finds itself opposite to a thread which is comparatively slack. Considering that the stretcher is operated through the medium of springs $d^{11}$ and $f^3$, it will under the said conditions swing outward by a considerable angle, as indicated by dotted lines in Fig. 24. The tappet $o^{13}$, connected to the operating mechanism of the said stretcher by the rod $o^{11}$ and lever $k'$ $k^7$, will consequently move a considerable distance in the direction of arrow 9 and rotate the shaft $o^8$ by a corresponding amount, and the said shaft will in turn impart a proportionate rotation to the disk $o'$, so that the groove $o^2$ of the latter comes into a position such as shown by dotted lines in Fig. 16. After the groove $o^2$ has thus been shifted the parts operating the arm $k^4$ cause the said arm to move upward together with the pawl $n^7$; but the pawl is prevented from engaging with the ratchet-wheel $n^5$ so long as the head $o^0$ of the arm $o$, fixed to the axle $n^0$ of the pawl, is opposite to the full portion of the periphery of the disk $o'$. As soon, however, as the said head $o^0$ comes opposite to the groove $o^2$ the spring $k^6$ draws the head $o^0$ into the groove, (see Fig. 19,) in consequence whereof the pawl engages with the ratchet-wheel and advances the same by an amount corresponding to the range of motion of the pawl from the beginning of its engagement with the wheel to the end of its stroke, and as this motion is transmitted by the parts $n^{10}$, $n^3$, $n^2$, $g^6$, $n'$, and $n$ to the piece B $l^6$ the whole mechanism carried by the latter will be raised proportionally with the effect hereinbefore described. When the arm $k^4$ moves backward, the controlling-arm $o$, first remaining in engagement with the groove $o^2$ and moving together with the arm $k^4$, returns the disk $o'$, and consequently the lever $o^{15}$, to their normal positions. Near the end of its receding motion the arm $o$ is disengaged from the groove $o^2$ by striking against an adjustable stop $k^5$, the pawl $n^7$ being thereby disengaged from the ratchet-wheel $n^5$ also. Whenever a long stitch has been made, the stretcher $d'$ will swing outward by a smaller angle than in the first case, the disk $o^2$ will consequently be rotated less, and the pawl $n^7$ will come sooner in engagement with the ratchet-wheel, thereby causing the piece B $l^6$ to be raised more.

The thread-stretcher $d^2$ operates by means of the parts connected thereto in precisely the same manner to control the raising of the piece B $l^6$ with regard to the stitches made on the other side of the cloth. It will be seen from the foregoing that the length of stroke of the take-up hooks is thus reduced after every stitch in proportion to the length of thread used up in making the same. The fly-pinion $g^4$, connected to the sleeve $n^{10}$ by a pair of bevel-wheels, serves to moderate the descent of the piece B $l^6$ and parts connected thereto, the said descent taking place when the retaining-pawl $n^6$ is disengaged from the ratchet-wheel by the rod $g^5$. In order to prevent the disk $o'$ from rotating too far by the momentum of the motion imparted to it, a brake $o^4$ is provided, which acts on the neck of the shaft $o^3$.

We claim as our invention—

1. The combination of the reciprocating grippers $a'$ $a^2$, the take-up hooks $b'$ $b^2$, frames composed of the bars $h$, to which the hooks are fixed, and racks $h'$, means for actuating the said frames so that the hooks move in paths lying in vertical planes, and the oscillating thread-stretchers $d'$ $d^2$, the said hooks having beaks $b^3$ inclined to their plane of motion, substantially as described.

2. The combination of the reciprocating grippers $a'$ $a^2$, the take-up hooks $b'$ $b^2$, bars $h$, carrying the same, racks $h'$, shafts $i$, rack-guides $h^2$, fixed to the latter, operating mechanism consisting in the rack-guides $i^2$, fixed to shafts $i$, racks $i'$, pinions $h^5$, gearing therewith, pinions $h^4$, gearing with racks $h'$, shafts $h^3$, mounted in the guides $h^2$ $i^2$ and carrying said pinions $h^4$ $h^5$, fixed cam-guides $i^3$, pivots $i^{12}$, by which the racks $i'$ engage with the said cam-guides $i^3$, and means for imparting reciprocating motion to the pivots $i^{12}$, substantially as described.

3. The combination of the racks $i'$, having pivots $i^{12}$, means for guiding said pivots, lever-arms $i^5$, means of connection between the arms $i^5$ and the pivots $i^{12}$, lever-arms $m$, axles $i^6$, to which said arms $i^5$ and $m$ are fixed, reciprocating bars $i^7$, carrying the axles $i^6$, bars $m'$ for guiding the arms $m$, and a cam-motion by which the bars $m'$ are operated, substantially as specified.

4. The combination of the racks $i'$, having pivots $i^{12}$, means for guiding said pivots, lever-arms $i^5$, means of connection between the arms $i^5$ and the pivots $i^{12}$, lever-arms $m$, axles $i^6$, to which said arms $i^5$ and $m$ are fixed, reciprocating bars $i^7$, carrying the axles $i^6$, bars $m'$ for guiding the arms $m$, sliding rod $m^5$, to which said bars $m'$ are pivoted, disk $m^6$, having cam-grooves $m^2$ $m^3$, pivots $i^9$ on bars $m'$, engaging with cam-groove $m^2$, lever $m^4$, having pivots $c^9$, engaging in cam-groove $m^3$, and means of connection between lever $m^4$ and rod $m^5$, substantially as specified.

5. The combination of the thread-stretchers $d'$ $d^2$, shafts $e'$ $e^2$, having arms $e$, that carry the said stretchers, cam-disk $f'$, levers $d^5$ $d^6$, spring $d^{11}$, and means of connection between the levers $d^5$ $d^6$ and the respective shafts $e'$ $e^2$, whereby the latter are oscillated through the said levers, substantially as described.

6. The combination of the thread-stretchers $d'$ $d^2$, shafts $e'$ $e^2$, having arms $e$, cam-disk $f'$, having the recesses 1 2, levers $d^5$ $d^6$, spring $d^{11}$, cam-disk $f^2$, with recess 3, levers $d^7$ $d^8$, having arms $d^9$, a spring or springs pressing the levers $d^7$ $d^8$ against the disk $f^2$, and means of connection between the levers $d^5$ $d^6$ and the respective shafts $e'$ $e^2$, substantially as specified.

7. The combination of the cam-disk $f^2$, levers $d^7$ $d^8$, torsional springs $f^3$ $f^4$, levers $f^5$ $f^6$, and means for shifting the latter and securing them in different positions, substantially as set forth.

8. The combination of the vertical sliding bars $i^7$, horizontal slide $l^5$, means of connection between the bars $i^7$ and the slide $l^5$, whereby a reciprocating motion of the latter causes the former to move up and down in opposite directions, lever-arm $l^4$, having grooves $j^3$ $j^4$, a pin $l^9$ on the slide $l^5$ engaging with the groove $j^3$, crank $l^3$, having pin $l^{10}$ engaging with the groove $j^4$, and means for imparting oscillatory motion to the crank $l^3$, substantially as specified.

9. The combination of the bars $i^7$, having rack-teeth, spur-wheel $i^9$, gearing therewith, pinion $i^{10}$, axle $i^{11}$, lever-arm $l^4$, having grooves $j^3$ $j^4$, toothed slide $l^5$, having pin $l^9$ engaging with the groove $j^3$, crank $l^3$, having pin $l^{10}$ engaging with the groove $j^4$, and means for imparting oscillatory motion to the crank $l^3$, substantially as specified.

10. The combination of the vertical sliding bars $i^7$, horizontal slide $l^5$, means of connection between the bars $i^7$ and the slide $l^5$, whereby a reciprocating motion of the latter causes the former to move up and down in opposite directions, lever-arm $l^4$, having grooves $j^3$ $j^4$, a pin $l^9$ on the slide $l^5$ engaging with the groove $j^3$, crank $l^3$, having pin $l^{10}$ engaging with the groove $j^4$, means for imparting oscillatory motion to the crank $l^3$, the vertically-adjustable piece composed of the horizontal guide-bar $l^6$ and vertical guide-bar B, rack $n$, fixed to bar B, pinion $n'$, ratchet-wheel $n^5$, means of connection between the latter and the said pinion $n'$, feeding-pawl $n^7$, retaining-pawl $n^6$, rotating cams $n^9$, and intermediate mechanism through which said cams $n^9$ operate the pawl $n^7$, substantially as hereinbefore set forth.

11. The combination of the bar B, having the rack $n$, pinion $n'$, ratchet-wheel $n^5$, means of connection between the latter and the pinion $n'$, hollow axle $n^4$, arm $k^4$, loose on axle $n^4$, axle $n^0$, mounted on arm $k^4$, feed-pawl $n^7$ and arm $o$, with head $o^0$, both fixed to said axle $n^0$, shaft $o^3$, having the disk $o'$, with groove $o^2$, disengager $k^5$, shaft $o^6$, with lever $o^{15}$, means of connection between the shafts $o^3$ and $o^8$, thread-stretchers $d'$ $d^2$, oscillating shafts $e'$ $e^2$, having arms $e$, carrying the said stretchers, rods $o^{11}$ $o^{12}$, means of connection between the shafts $e'$ $e^2$ and the said rods, whereby these are shifted when the shafts $e'$ $e^2$ are oscillated, and tappets $o^{13}$ $o^{14}$ on said rods, substantially as described.

12. In an embroidering-machine, the combination of the reciprocating grippers $a'$ $a^2$, bars $a^8$ and slides $a^{11}$, on which they are mounted, guides $a^{12}$ for the said slides, take-up hooks $b'$ $b^2$, frames composed of the bars $h$, carrying the hooks, and racks $h'$, mechanism for operating the said frames and comprising shafts $i$, with bearings $c$, and a machine-frame composed of two standards D and longitudinal beams E, to which the said guides $a^{12}$ and bearings $c$ are fixed, substantially as specified.

In testimony whereof we have hereunto set our hands in the presence of two subscribing witnesses.

EDWARD BUSS.
ADOLPH SAURER.

Witnesses:
C. ZURPINGER,
D. FISCHER.